US012748190B2

(12) United States Patent
Hirono et al.

(10) Patent No.: US 12,748,190 B2
(45) Date of Patent: Sep. 29, 2026

(54) LIDAR DEVICE AND CONTROL METHOD FOR LIDAR DEVICE

(71) Applicant: KABUSHIKI KAISHA TOSHIBA, Tokyo (JP)

(72) Inventors: Masatoshi Hirono, Yokohama Kanagawa, PA (US); Hiroshi Kubota, Yamato Kanagawa (JP); Nobu Matsumoto, Ebina Kanagawa (JP); Katsuyuki Kimura, Kamakura Kanagawa (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 837 days.

(21) Appl. No.: 18/176,914

(22) Filed: Mar. 1, 2023

(65) Prior Publication Data

US 2023/0296733 A1 Sep. 21, 2023

(30) Foreign Application Priority Data

Mar. 18, 2022 (JP) ................................ 2022-044475

(51) Int. Cl.
*G01S 7/481* (2006.01)
*G01S 17/10* (2020.01)

(52) U.S. Cl.
CPC .......... *G01S 7/4817* (2013.01); *G01S 7/4811* (2013.01); *G01S 17/10* (2013.01)

(58) Field of Classification Search
None
See application file for complete search history.

(56) References Cited

U.S. PATENT DOCUMENTS

2013/0229645 A1 9/2013 Suzuki et al.
2019/0101627 A1 4/2019 Hansson et al.
(Continued)

FOREIGN PATENT DOCUMENTS

JP 2000-009839 A 1/2000
JP 2010-071725 4/2010
(Continued)

OTHER PUBLICATIONS

KR-2021004761-A translation.*
Office Action issued in Japanese Patent Application No. 2022-044475, dated Aug. 5, 2025 in 3 pages.

*Primary Examiner* — Luke D Ratcliffe
(74) *Attorney, Agent, or Firm* — Knobbe, Martens, Olson & Bear, LLP

(57) ABSTRACT

A LiDAR device according to an embodiment includes a rotating mirror having reflective surfaces, first/second light emitters each emitting light toward the rotating mirror, and first/second light receivers each receiving light reflected by the rotating mirror and converting the received light into an electrical signal. The first light emitter emits light in an orientation where an upper section of a distance measurement range is scanned. The second light emitter emits light in an orientation where a lower section of the distance measurement range is scanned. The first light receiver is provided at a position where light emitted by the first light emitter and reflected at the distance measurement range is received via the rotating mirror. The second light receiver is provided at a position where light emitted by the second light emitter and reflected at the distance measurement range is received via the rotating mirror.

6 Claims, 10 Drawing Sheets

(56) References Cited

U.S. PATENT DOCUMENTS

| | | | | |
|---|---|---|---|---|
| 2020/0049819 | A1* | 2/2020 | Cho | G02B 26/123 |
| 2020/0333444 | A1 | 10/2020 | Fu et al. | |
| 2023/0028159 | A1* | 1/2023 | Yang | G02B 27/0955 |

FOREIGN PATENT DOCUMENTS

| | | | | |
|---|---|---|---|---|
| JP | 2012-117996 | | | 6/2012 |
| JP | 2013-170962 | A | | 9/2013 |
| JP | 2015-125109 | | | 7/2015 |
| JP | 2017-138298 | A | | 8/2017 |
| KR | 2021004761 | A | * | 1/2021 |
| WO | WO 2017/183530 | A1 | | 10/2017 |

* cited by examiner

LIDAR DEVICE AND CONTROL METHOD FOR LIDAR DEVICE

CROSS-REFERENCE TO RELATED APPLICATIONS

This application is based upon and claims the benefit of priority from Japanese Patent Application No. 2022-044475, filed on Mar. 18, 2022, the entire contents of which are incorporated herein by reference.

FIELD

Embodiments described herein relate generally to a LiDAR device and a control method for a LiDAR device.

BACKGROUND

Devices called LiDAR (light detection and ranging or laser imaging detection and ranging) devices are known. The LiDAR device is a device that calculates the distance to a distance measurement target by irradiating a distance measurement range with pulsed light (for example, laser light) emitted by a light source, capturing light (reflected light or scattered light) reflected (or scattered) by an object (as the distance measurement target) present in the distance measurement range, and measuring the time (round trip time of light) from emission to reception of light.

LiDAR devices are used in various technologies such as automated driving. The LiDAR device determines the position or even the shape of a distance measurement target by, for example, scanning the surface of the target with light.

The LiDAR device scans a distance measurement target with light by reflecting light (for example, laser light) with a mirror and changing the orientation of the mirror. When the scanning direction is a lateral direction (substantially horizontal direction), the resolution in the longitudinal direction (substantially vertical direction) depends on the number of pixels arranged in the longitudinal direction of a light-receiving element.

Possible methods to increase the resolution in the longitudinal direction (substantially vertical direction), that is, the vertical resolution in the LiDAR device are, for example, increasing the number of pixels of the light-receiving element, reducing the pixel size, or using, as the mirror, a polygon mirror having a plurality of mirror surfaces with different vertical tilt angles.

However, with such methods, it is difficult to avoid increase in costs for manufacturing new light-receiving elements or mirrors. Using a polygon mirror as the mirror incurs size increase and thereby reduces vibration resistance performance and rigidity.

Moreover, increasing the number of pixels not only incurs size increase of the light-receiving element but also causes the need for increasing the focal length of a lens for forming an image on the light-receiving element and inevitably increases the size of the device. Reducing the pixel size reduces the amount of light received by each pixel and therefore requires an imaging optical system (including lenses, etc.) that does not deteriorate the performance, thereby making the device expensive.

DETAILED DESCRIPTION

A LiDAR device according to an embodiment includes a rotating mirror, light emitters, and light receivers. The rotating mirror is driven to rotate around an axis of rotation oriented longitudinally. The light emitters are each configured to emit light toward the rotating mirror. The light receivers are each configured to receive light reflected by the rotating mirror and convert the received light into an electrical signal. The rotating mirror includes reflective surfaces reflecting light. Each of the reflective surfaces is configured to, with rotation of the rotating mirror, cause light emitted by a corresponding one of the light emitters to scan a distance measurement range in a lateral direction, and cause light reflected from the distance measurement range to travel toward a corresponding one of the light receivers. The light emitters include a first light emitter and a second light emitter. The first light emitter is configured to emit light in an orientation where an upper section of the distance measurement range is scanned. The distance measurement range is divided into the upper section and a lower section. The second light emitter is configured to emit light in an orientation where the lower section of the distance measurement range is scanned. The first light emitter is provided at a position facing one of the reflective surfaces. The second light emitter is provided at a position facing another one of the reflective surfaces whose orientation is different from the one of the reflective surfaces to which the first light emitter faces. The light receivers include a first light receiver and a second light receiver. The first light receiver is provided at a position where light emitted by the first light emitter and reflected at the distance measurement range is received via the rotating mirror. The second light receiver is provided at a position where light emitted by the second light emitter and reflected at the distance measurement range is received via the rotating mirror.

Embodiments of a LiDAR device will be described with reference to the drawings. In this specification, components according to embodiments and explanation of the components may be described in multiple expressions. The components and the description thereof are by way of example and are not intended to be limited by the expressions in the specification. The components may also be identified by names different from those in the specification. The components may also be explained by expressions different from the expressions in the specification.

First Embodiment

Figure 1A:
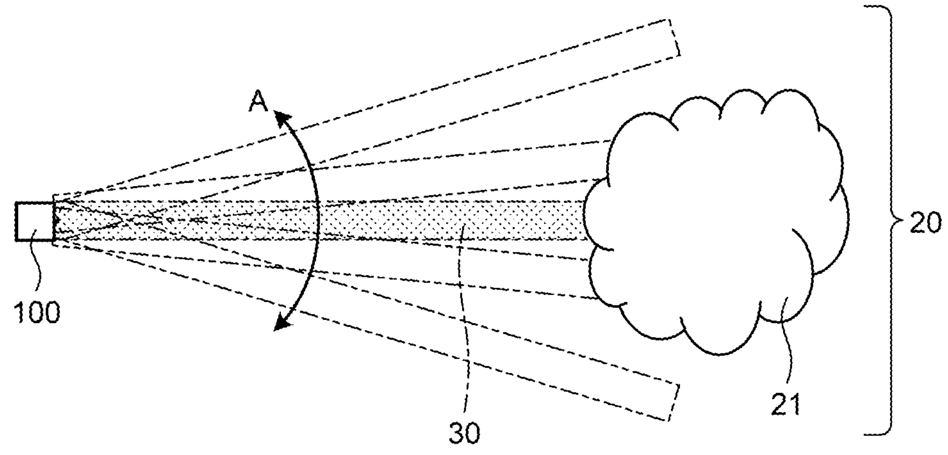
FIG. 1A is a plan view illustrating scanning of a distance measurement target by a LiDAR device.
Figure 1B:
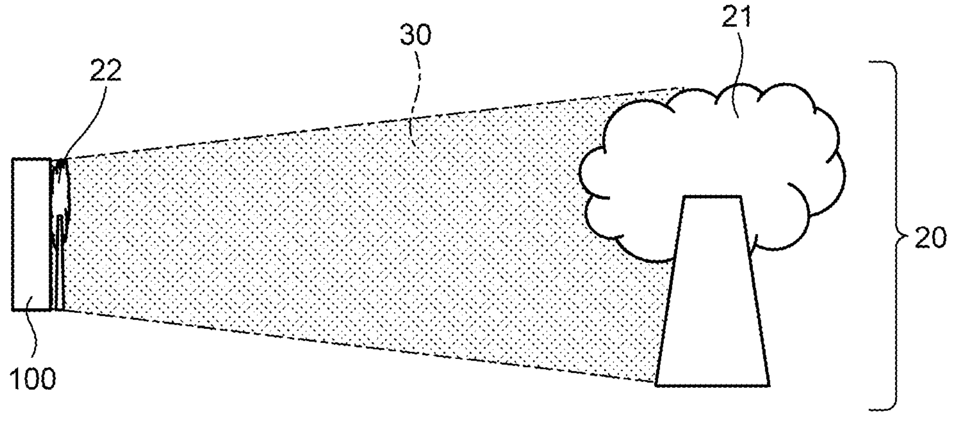
FIG. 1B is a side view illustrating scanning of a distance measurement target by the LiDAR device.

FIG. 1A is a plan view illustrating scanning of a distance measurement target by a LiDAR device 100. FIG. 1B is a side view illustrating scanning of a distance measurement target by the LiDAR device 100. The LiDAR device 100 is installed in, for example, a self-driving car to measure various targets, such as roads, buildings, pedestrians, other vehicles, and obstacles. Note that "LiDAR" is an acronym for light detection and ranging or laser imaging detection and ranging.

The LiDAR device 100 calculates the distance to the distance measurement target by irradiating a distance measurement range 20 with light 30 emitted by a light source, detecting light (reflected or scattered light) reflected (or scattered) by an object (distance measurement target) 21 present in the distance measurement range 20, and measuring the time (round trip time of light) from emission to reception of light. The distance measurement range 20 is the "field of view" of the LiDAR device 100.

The light 30 emitted by the LiDAR device 100 is linear in a planar view (see FIG. 1A). Additionally, the light 30 diverges in the longitudinal direction (substantially vertical direction) in a side view (see FIG. 1B). The LiDAR device 100 scans the rectangular distance measurement range 20 in the lateral direction (substantially horizontal direction) while illuminating it in the longitudinal direction by moving radiation light as depicted by arrow A in FIG. 1A to determine the position and the shape of the distance measurement target 21.

Figure 2:
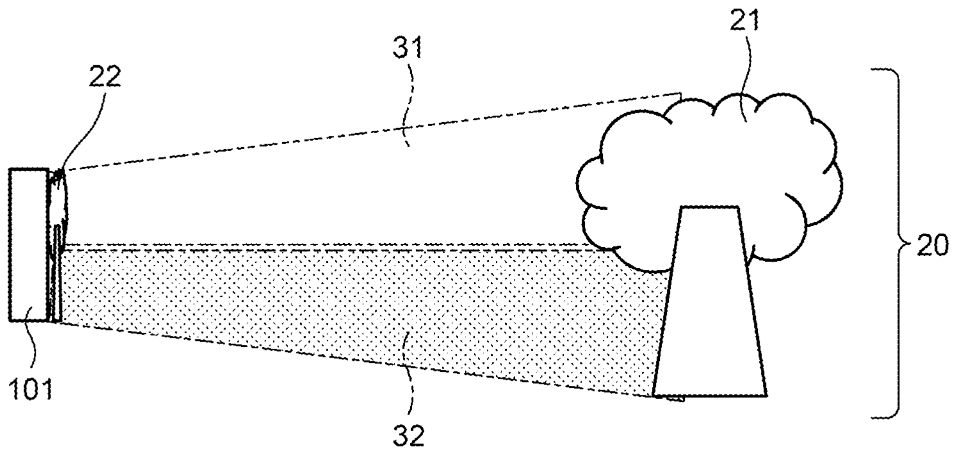
FIG. 2 is a side view illustrating scanning by a LiDAR device according to a first embodiment.

FIG. 2 is a side view illustrating scanning by a LiDAR device 101 according to a first embodiment. The LiDAR device 101 in the present embodiment scans two divided sections of the distance measurement range 20: an upper section and a lower section, individually, rather than simultaneously. With this configuration, the LiDAR device 101 substantially doubles the vertical resolution compared to the conventional one while using a light-receiving element with the number of pixels and pixel size equivalent to the conventional ones.

Figure 3A:
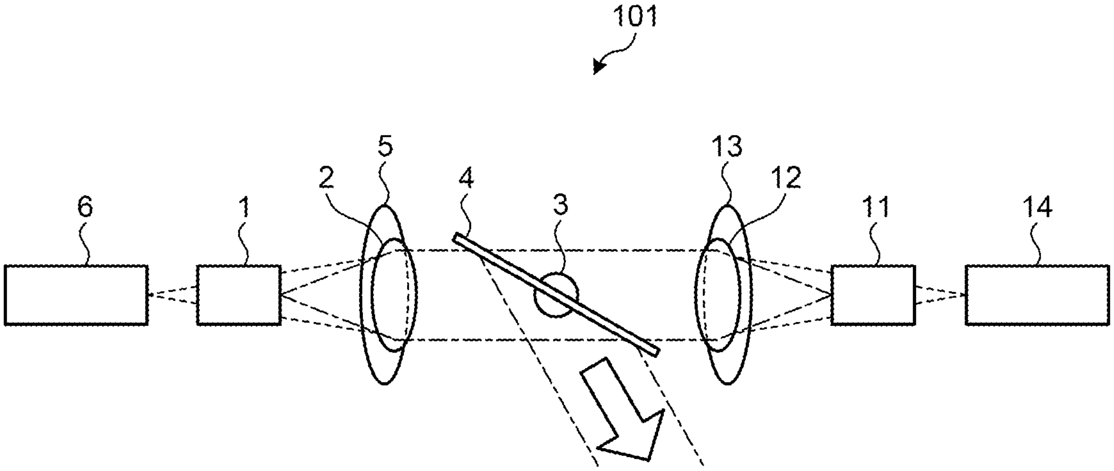
FIG. 3A is a plan view illustrating a structure of the LiDAR device in the first embodiment.
Figure 3B:
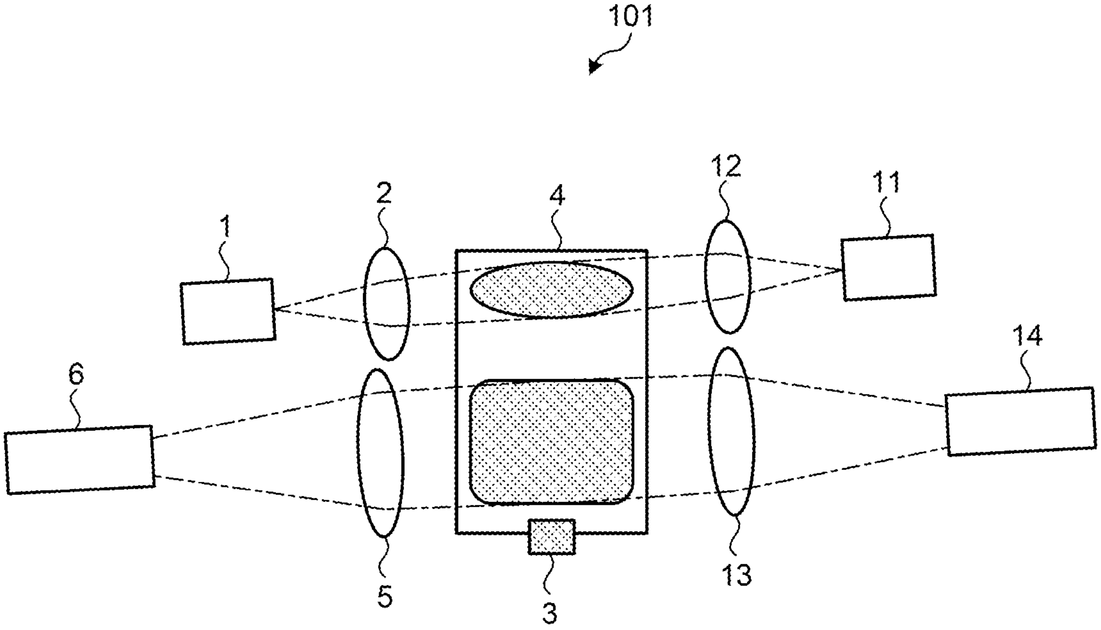
FIG. 3B is a front view illustrating a structure of the LiDAR device in the first embodiment.

A configuration of the LiDAR device 101 will now be described. FIG. 3A is a plan view illustrating a structure of the LiDAR device 101 in the first embodiment. FIG. 3B is a front view illustrating a structure of the LiDAR device 101 in the first embodiment. The structure of the LiDAR device 101 is not limited to the example illustrated in FIG. 3A and FIG. 3B.

The LiDAR device 101 includes a light source 1, a collimator lens 2, a rotating stand 3, a double-sided mirror 4, an imaging lens 5, and a line sensor 6, and further includes a light source 11, a collimator lens 12, an imaging lens 13, and a line sensor 14. The LiDAR device 101 may further include other parts and devices.

The light sources 1 and 11 and the collimator lenses 2 and 12 are examples of light emitters each emitting light toward the double-sided mirror 4. The light sources 1 and 11 are, for example, laser diodes (LD) capable of pulsed emission. The light source 1 operates under control of a control unit 110 (described below) of the LiDAR device 101 to emit light (for example, laser light) 31. Similarly, the light source 11 operates under control of the control unit 110 (described below) to emit light (for example, laser light) 32. The light 31 and 32 is, for example, visible light. The light 31 and 32 may be infrared rays, ultraviolet rays, or X-rays.

The collimator lens 2 collimates (converts light into parallel light) the light 31 emitted from the light source 1 and incident on the collimator lens 2, and emits the collimated light toward the double-sided mirror 4. In other words, the collimator lens 2 converts light passing through the collimator lens 2 into light focused at infinity.

Similarly, the collimator lens 12 collimates the light 32 emitted from the light source 11 and incident on the collimator lens 12 and emits the collimated light toward the double-sided mirror 4. In other words, the collimator lens 12 converts light passing through the collimator lens 12 into light focused at infinity.

The double-sided mirror 4 and the rotating stand 3 constitute an example of a rotating mirror that is driven to rotate around an axis of rotation oriented longitudinally (for example, substantially vertical direction). The rotating stand 3 rotates the double-sided mirror 4 around the axis of rotation along the substantially vertical direction. The axis of rotation is the virtual central axis of rotation of a reflective surface. The double-sided mirror 4 has, for example, a rectangular shape and is provided upright on the rotating stand 3 with its lengthwise direction along the substantially vertical direction. The double-sided mirror 4 is a mirror having substantially planar reflective surfaces on both sides to reflect laser light. With rotation of the double-sided mirror 4, each of the reflective surfaces causes light emitted by the light sources 1 and 11 to scan the distance measurement range 20 in the lateral direction (for example, in the substantially horizontal direction) and causes light reflected from the distance measurement range 20 to travel toward the line sensors 6 and 14.

In the present embodiment, as illustrated in FIG. 3B, the optical axis of the light source 1 and the axis of rotational symmetry of the collimator lens 2 are tilted upward with respect to a virtual plane orthogonal to the axis of rotation of the double-sided mirror 4 and the rotating stand 3. With this configuration, the light source 1 and the collimator lens 2 constitute an example of a first light emitter to emit the light 31 in an orientation where the upper section of the distance measurement range 20, which is divided into upper and lower sections, is scanned.

Similarly, the optical axis of the light source 11 and the axis of rotational symmetry of the collimator lens 12 are tilted downward with respect to a virtual plane orthogonal to the axis of rotation of the double-sided mirror 4 and the rotating stand 3, as illustrated in FIG. 3B. With this configuration, the light source 11 and the collimator lens 12 constitute an example of a second light emitter to emit the light 32 in an orientation where the lower section of the distance measurement range 20 is scanned.

The first light emitter including the light source 1 and the second light emitter including the light source 11 are provided at positions where they do not simultaneously irradiate the same reflective surface of the double-sided mirror 4. In other words, the first light emitter is provided at a position facing one of the reflective surfaces of the double-sided mirror 4, while the second light emitter is provided at a position facing another one of the reflective surfaces whose orientation is different from the one of the reflective surfaces to which the first light emitter faces. The first light emitter and the second light emitter are a pair of light emitters that emit light in two different directions and irradiate the double-sided mirror 4 in two different directions. The double-sided mirror 4 is disposed at a position where light emitted in two different directions by the pair of light emitters can be received.

The imaging lens 5 and the line sensor 6 are an example of a light receiver and also constitute a first light receiver that receives light reflected by the double-sided mirror 4 and converts the received light into an electrical signal. The imaging lens 5 and the line sensor 6 receive the light 31, which is emitted by the first light emitter and reflected at the distance measurement range 20, via the double-sided mirror 4. Similarly, the imaging lens 13 and the line sensor 14 are an example of a light receiver and also constitute a second light receiver that receives light reflected by the double-sided mirror 4 and converts the received light into an electrical signal. The imaging lens 13 and the line sensor 14 receive the light 32, which is emitted by the second light emitter and reflected at the distance measurement range 20, via the double-sided mirror 4.

The imaging lens 5 collects the light 31, which is reflected by the distance measurement target 21 and incident via the double-sided mirror 4, and forms an image on the line sensor 6. Similarly, the imaging lens 13 collects the light 32, which is reflected by the distance measurement target 21 and incident via the double-sided mirror 4, and forms an image on the line sensor 14 (an image 22 formed on the line sensor 14 is schematically illustrated in FIG. 2).

The line sensors 6 and 14 are each examples of a light-receiving element having a plurality of pixels aligned in the longitudinal direction. The line sensors 6 and 14 detect the received light for each pixel and generate and output an electrical signal corresponding to the received light. The arrangement of the light-receiving element is not limited to this example.

In the LiDAR device 101 with such a configuration described above, light emitted from the light source 1 has a light distribution shaped by the collimator lens 2 and is reflected by the upper portion of the rotating double-sided mirror 4 to scan the distance measurement range 20 in the substantially horizontal direction. The reflected light from the distance measurement target 21 is reflected by the lower portion of the double-sided mirror 4 and forms an image on the line sensor 6 by the imaging lens 5.

Similarly, light emitted from the light source 11 has a light distribution shaped by the collimator lens 12 and is reflected by the upper portion of the double-sided mirror 4 to scan the distance measurement range 20 in the substantially horizontal direction. The reflected light from the distance measurement target 21 is reflected by the lower portion of the double-sided mirror 4 and forms an image on the line sensor 14 by the imaging lens 13.

Figure 4:
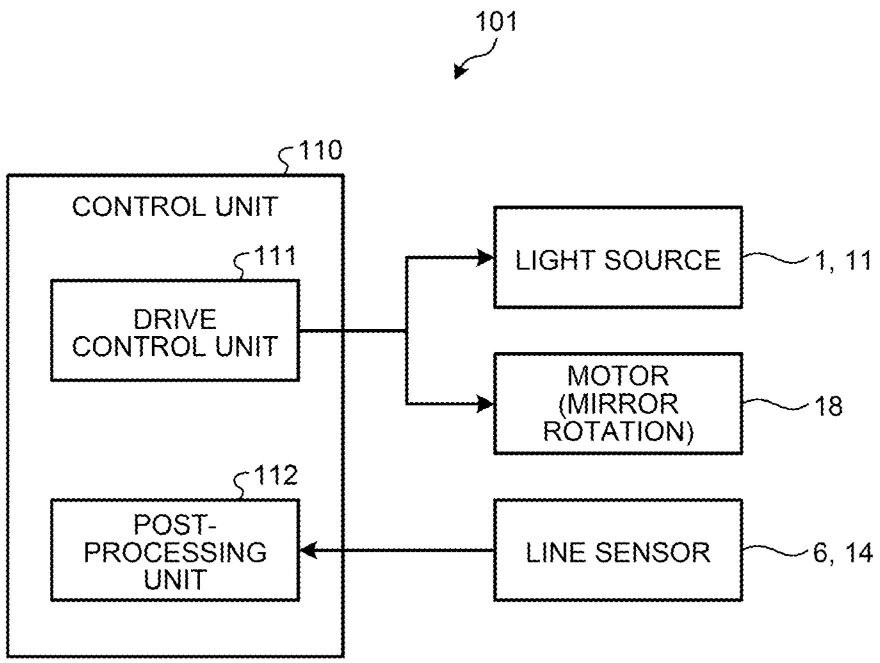
FIG. 4 is a block diagram illustrating an electrical configuration example of the LiDAR device in the first embodiment.

FIG. 4 is a block diagram illustrating an electrical configuration example of the LiDAR device 101 in the first embodiment. The LiDAR device 101 further includes a control unit 110 and a motor 18.

The motor 18 is driven to rotate the rotating stand 3, and thereby the double-sided mirror 4 rotates around the axis of rotation in the longitudinal direction (substantially vertical direction). With this rotation, the light 31 and 32 emitted by the light sources 1 and 11 scans the distance measurement range 20 in the lateral direction (substantially horizontal direction).

The control unit 110 is, for example, a computer including a processor such as a central processing unit (CPU), a storage device such as a read only memory (ROM), a random access memory (RAM), and a flash memory, and a bus connecting them. The control unit 110 is electrically connected to the light sources 1 and 11, the line sensors 6 and 14, and the motor 18.

The processor in the control unit 110 executes a computer program read from the ROM or the flash memory to function as a drive control unit 111 and a post-processing unit 112.

The post-processing unit 112 performs various processing on the basis of output of the line sensors 6 and 14. For example, the post-processing unit 112 reconstructs an image that reflects a front view of the distance measurement target 21. The post-processing unit 112 measures the distance to each portion of the distance measurement target 21. Additionally, the post-processing unit 112 determines the shape of the distance measurement target 21.

More specifically, the post-processing unit 112 calculates the shape of the target and the distance to the target on the basis of, for example, the difference between the time when the light sources 1 and 11 emit light 31 and 32 and the time when the line sensors 6 and 14 receive light 31 and 32 reflected from the target. The functional configuration of the control unit 110 is not limited to this example.

The drive control unit 111 is a functional unit that controls the light sources 1 and 11 and the motor 18. More specifically, the drive control unit 111 appropriately synchronizes the orientation of the reflective surfaces of the rotating double-sided mirror 4 and the light emission timing of the light sources 1 and 11.

In order to ensure eye safety, the light sources 1 and 11 are designed to emit light only when the light is incident on any of the reflective surfaces of the double-sided mirror 4. The distance measurement range 20 is set on the front side of the LiDAR device 101, whereas the distance on the rear side of the LiDAR device 101 is not measured.

The drive control unit 111 therefore alternately drives either the light source 1 or the light source 11.

Supposing that the time difference set to prevent interference between the light 31 emitted by the light source 1 and the light 32 emitted by the light source 11 is A, the processing may generally be performed as described below.

Figure 5:
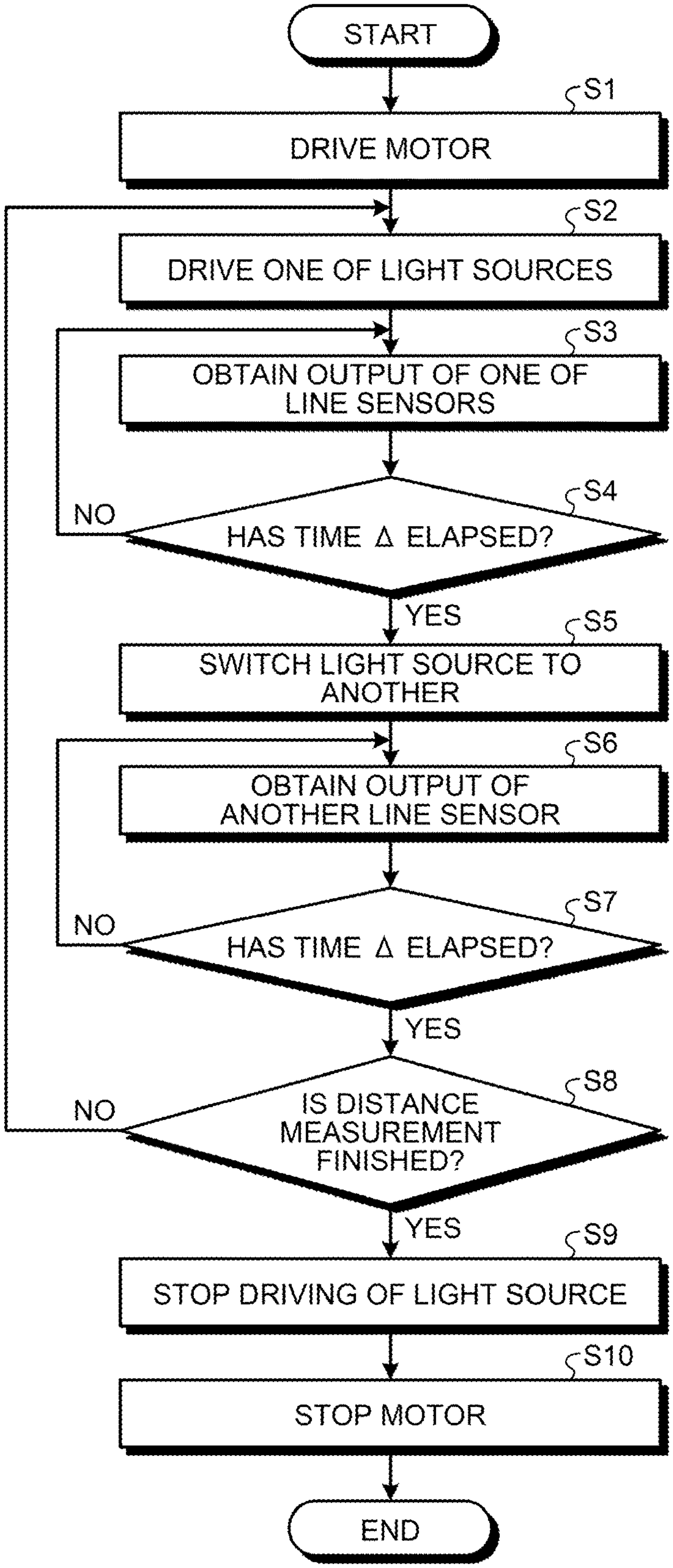
FIG. 5 is a flowchart illustrating exemplary processing performed by a control unit of the LiDAR device in the first embodiment.

FIG. 5 is a flowchart illustrating exemplary processing performed by the control unit 110 of the LiDAR device 101 in the first embodiment.

The control unit 110 functions as the drive control unit 111 that drives the motor 18 to rotate the double-sided mirror 4 (step S1). The control unit 110 then functions as the drive control unit 111 that causes the light source 1 to emit pulses at a predetermined timing (step S2), and functions as the post-processing unit 112 that obtains output of the line sensor 6 (step S3).

The control unit 110 then continues the above processing until the elapsed time from step S2 becomes Δ (No at step S4). When the elapsed time from step S2 becomes Δ (Yes at step S4), the control unit 110 switches the optical system to be driven. In other words, the control unit 110 functions as the drive control unit 111 that stops driving the light source 1 and starts driving the light source 11 (step S5). At step S5, the light source 11 emits pulses at a predetermined timing in the same manner as the light source 1. Subsequently, the control unit 110 functions as the post-processing unit 112 that obtains output of the line sensor 14 (step S6).

The control unit 110 functioning as the post-processing unit 112 generates images, performs distance measurement, and performs AI analysis, by using the output (electrical signals) obtained from the line sensor 6 and the line sensor 14.

The control unit 110 continues the above processing until the elapsed time from step S5 becomes Δ (No at step S7). When the elapsed time from step S5 becomes Δ (Yes at step S7), the control unit 110 determines whether the distance measurement is finished (step S8). In response to determining that the timing to finish the distance measurement has not been reached (No at step S8), the control unit 110 switches the optical system to be driven. In other words, the control unit 110 returns the processing to step S2.

In response to determining that the distance measurement is finished (Yes at step S8), the control unit 110 functions as the drive control unit 111 to stop the emission of the light source 1 or the light source 11 in operation (step S9), and then stop the motor 18 (step S10).

The LiDAR device 101 of the present embodiment operating described above is capable of doubling the vertical resolution, as illustrated in FIG. 2, while using the light-receiving elements (line sensors 6 and 14) equivalent to the conventional ones.

In addition, according to the present embodiment, the light sources 1 and 11 and the collimator lenses 2 and 12 are installed symmetrically on both sides across the double-sided mirror 4 in a tilted manner, and those on each side measures distance of the corresponding one of upper and lower sections of the field of view (distance measurement range 20) of the LiDAR device 101. This configuration slightly increases the size of the LiDAR device 101 compared with conventional devices, but does not require higher performance of the imaging lenses 5 and 13 and can measure distance of the vertical field of view as large as the conventional one at a double resolution at lower costs than other means since the configuration uses the same sensor as that of conventional devices.

Although distance measurement results similar to those of the LiDAR device 101 can be achieved using two conventional LiDAR devices, the LiDAR device 101 is preferable in that image processing is relatively easy because the two optical systems share a rotating mirror whereby the frame rates are automatically synchronized.

Other embodiments will now be described. The following embodiments are modifications to the first embodiment, so that the parts already described in the first embodiment are denoted by the same reference signs and will not be further elaborated. The parts different from those in the first embodiment will be described in detail.

Second Embodiment

Figure 6:
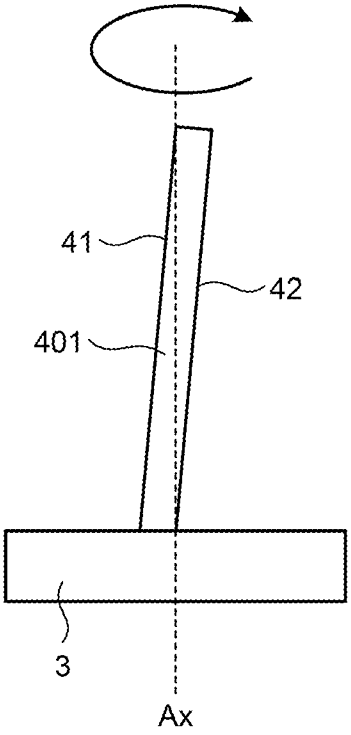
FIG. 6 is a diagram illustrating a double-sided mirror of a LiDAR device according to a second embodiment.
Figure 7:
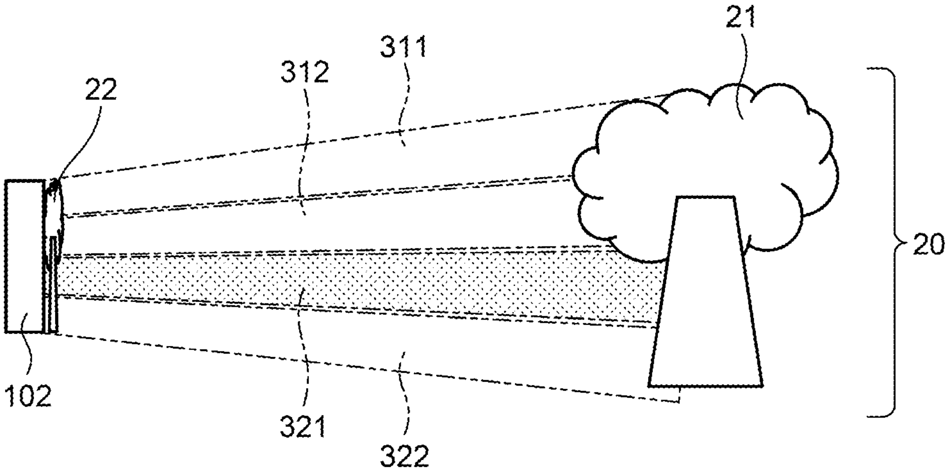
FIG. 7 is a side view illustrating scanning by the LiDAR device in the second embodiment.

FIG. 6 is a diagram illustrating a double-sided mirror 401 and the rotating stand 3 of a LiDAR device according to a second embodiment. FIG. 7 is a side view illustrating scanning by a LiDAR device 102 in the second embodiment.

In the LiDAR device 102, one reflective surface 41 of the double-sided mirror 401 is inclined in a tilted direction with respect to the axis of rotation Ax, and the other reflective surface 42 is inclined in the opposite direction. The reflective surfaces 41 and 42 and the direction of incidence of light on the reflective surfaces 41 and 42 are not orthogonal but are tilted obliquely.

In the LiDAR device 102 with such a configuration, light emitted by the light source 1 and incident obliquely upward on the double-sided mirror 4 is further directed upward when reflected by the reflective surface 41. The upward orientation is slightly canceled out when the light is reflected by the reflective surface 42. Light emitted by the light source 11 and incident obliquely downward on the double-sided mirror 4 is further directed downward when reflected by the reflective surface 42. The downward orientation is slightly canceled out when the light is reflected by the reflective surface 41.

The angles of the reflective surfaces 41 and 42 are set on the basis of the mechanism described above, whereby the LiDAR device 102 is able to perform scanning with light 311, 312, 321, and 322 in four directions illustrated in FIG. 7. The situation illustrated in FIG. 7 represents that the scanning with light 311 emitted by the light source 1 and reflected by the reflective surface 41 and the scanning with light 312 emitted by the light source 1 and reflected by the reflective surface 42 are finished, the scanning with light 321 emitted by the light source 11 and reflected by the reflective surface 41 is in progress, and, subsequently, the scanning with light 322 emitted by the light source 11 and reflected by the reflective surface 42 will be performed.

The LiDAR device 102 in this manner can increase the vertical resolution twice higher than using the double-sided mirror 4 and therefore can provide a vertical resolution four times higher than conventional devices.

Modification

Figure 8A:
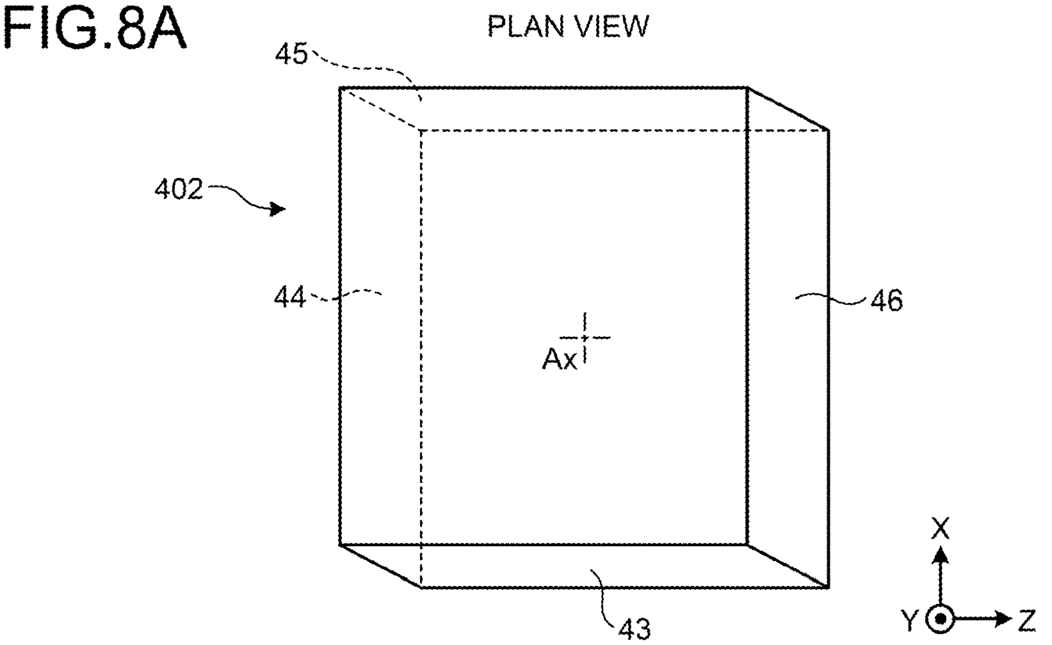
FIG. 8A is a plan view illustrating a modification of a rotating mirror of the LiDAR device in the second embodiment.
Figure 8B:
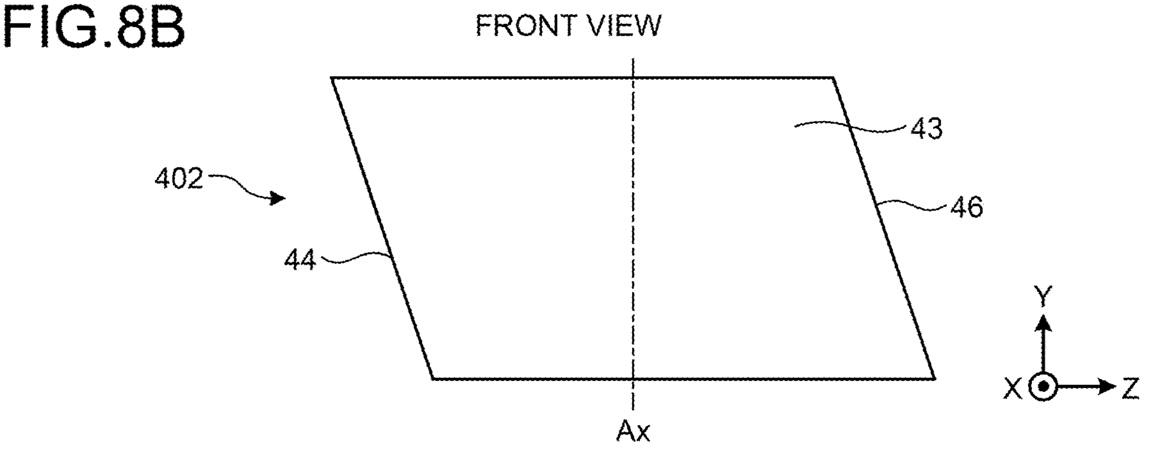
FIG. 8B is a front view illustrating a modification of a rotating mirror of the LiDAR device in the second embodiment.
Figure 8C:
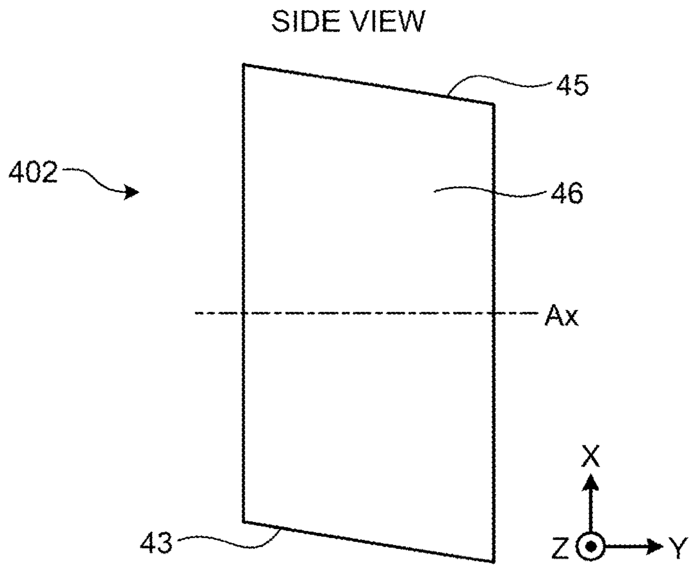
FIG. 8C is a side view illustrating a modification of a rotating mirror of the LiDAR device in the second embodiment.

FIGS. 8A to 8C are each a diagram illustrating a modification of a rotating mirror (constituted with the double-sided mirror 4 and the rotating stand 3) of the LiDAR device 102 in the second embodiment. FIG. 8A is a plan view, FIG. 8B is a front view, and FIG. 8C is a side view. The rotating mirror may be a polygon mirror. A polygon mirror 402 illustrated in each of FIGS. 8A to 8C has a substantially quadrangular prism shape and has four reflective surfaces 43, 44, 45, and 46. The reflective surfaces 43 and 46 are inclined obliquely upward with respect to the axis of rotation Ax, and the reflective surfaces 44 and 45 are inclined obliquely downward with respect to the axis of rotation Ax. The degree of inclination differs between the reflective surface 43 and the reflective surface 46 facing upward, and the degree of inclination also differs between the reflective surface 44 and the reflective surface 45 facing downward. In other words, the inclination states of the reflective surfaces 43 to 46 are different from each other.

The polygon mirror 402 in this manner can further increase the vertical resolution twice higher than using the double-sided mirror 401 having two reflective surfaces 41 and 42 and therefore can provide a vertical resolution eight times higher than conventional devices.

A polygon mirror having more surfaces may be used, or a polygon mirror having three surfaces may be used. However, a polygon mirror tends to become larger as the number of surfaces increases, and may involve a tradeoff between vertical resolution and size.

Third Embodiment

Figure 9:
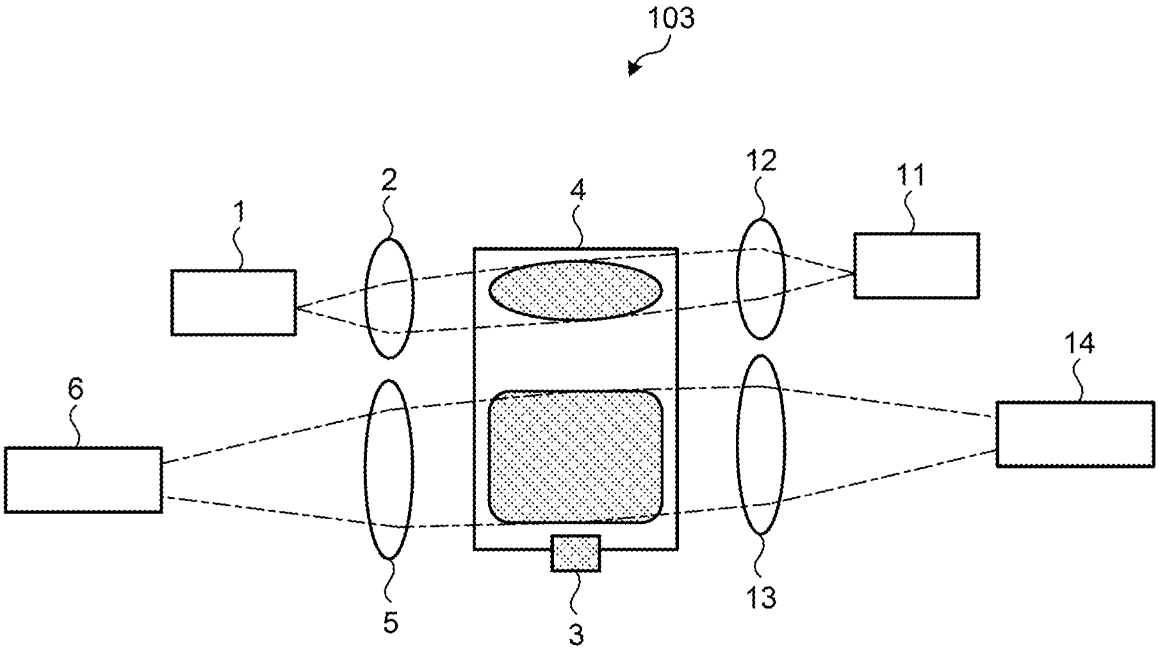
FIG. 9 is a front view illustrating a structure of a LiDAR device according to a third embodiment.

FIG. 9 is a front view illustrating a structure of a LiDAR device 103 according to a third embodiment. The optical axes of the light sources 1 and 11 and the axis of rotational symmetry of the collimator lenses 2 and 12 in the present embodiment are not tilted but are substantially parallel to the virtual plane orthogonal to the axis of rotation of the double-sided mirror 4 and the rotating stand 3. The term "substantially parallel" is not limited to perfectly parallel but is intended to permit slight deviations from being perfectly parallel. In addition, the axis of rotational symmetry of the collimator lenses 2 and 12 is shifted from the optical axes of the light sources 1 and 11 by a predetermined distance in a direction along the axis of rotation of the double-sided mirror 4.

This configuration can achieve generally the same effects as the LiDAR device 101 in the first embodiment.

Fourth Embodiment

Figure 10:
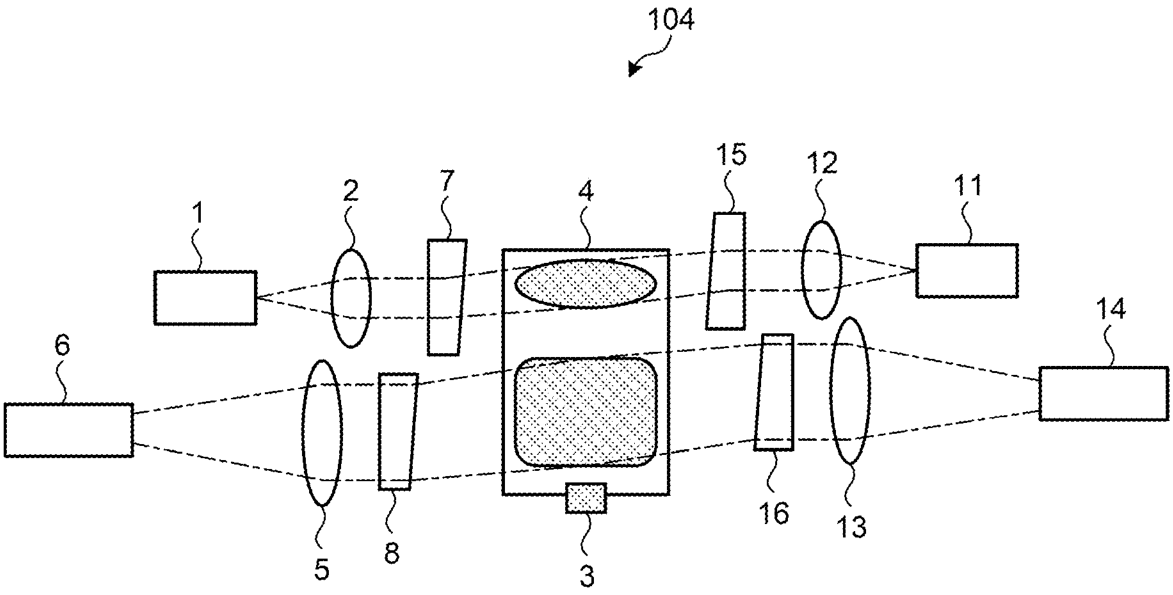
FIG. 10 is a front view illustrating a structure of a LiDAR device according to a fourth embodiment.

FIG. 10 is a front view illustrating a structure of a LiDAR device 104 according to a fourth embodiment. The optical axes of the light sources 1 and 11 and the axis of rotational symmetry of the collimator lenses 2 and 12 in the present embodiment are not tilted but are substantially parallel to the virtual plane orthogonal to the axis of rotation of the double-sided mirror 4 and the rotating stand 3. In addition, in the LiDAR device 104 of the present embodiment, the optical axes of the light sources 1 and 11 and the axis of rotational symmetry of the collimator lenses 2 and 12 are not shifted but are substantially matched with each other, although they are shifted in the LiDAR device 103 according to the third embodiment described above.

The LiDAR device 104 also includes a prism 7 in the optical path between the collimator lens 2 and the double-sided mirror 4 to correct the orientation of the optical axis of the light source 1 upward. The LiDAR device 104 further includes a prism 15 in the optical path between the collimator lens 12 and the double-sided mirror 4 to correct the orientation of the optical axis of the light source 11 downward.

The LiDAR device 104 also includes a prism 8 in the optical path between the double-sided mirror 4 and the imaging lens 5. The prism 8 corrects the orientation of light incident downward obliquely from above, slightly upward. The prism 8 thus substantially matches the orientation of the light incident obliquely from above with the axis of the imaging lens 5. Here, the orientation of light corrected by the prism 8 in the present embodiment is substantially horizontal. The term "substantially horizontal" is not limited to perfectly horizontal but is intended to permit slight deviations from being perfectly horizontal.

The LiDAR device 104 includes a prism 16 in the optical path between the double-sided mirror 4 and the imaging lens 13. The prism 16 corrects the orientation of light incident upward obliquely from below, slightly downward. The prism 16 thus substantially matches the orientation of the light incident obliquely from below with the axis of the imaging lens 13. The orientation of light corrected by the prism 16 in the present embodiment is substantially horizontal.

This configuration can achieve the effects equivalent to the LiDAR device 101 in the first embodiment. In other words, in the LiDAR device 104 in the present embodiment, instead of the axis shift of the collimator lenses 2 and 12 in the foregoing third embodiment, the optical axis is corrected by the prism 7 or the prism 15 immediately before light is incident on the double-sided mirror 4, and the optical axis is corrected by the prism 8 or the prism 16 immediately after light is incident on the double-sided mirror 4. Accordingly, aberrations that may occur in the LiDAR device 103 in the third embodiment are unlikely to occur in the LiDAR device 104 in the present embodiment. With this configuration, the present embodiment enables the optical elements to be arranged upright while maintaining illuminance and resolution.

Fifth Embodiment

Figure 11A:
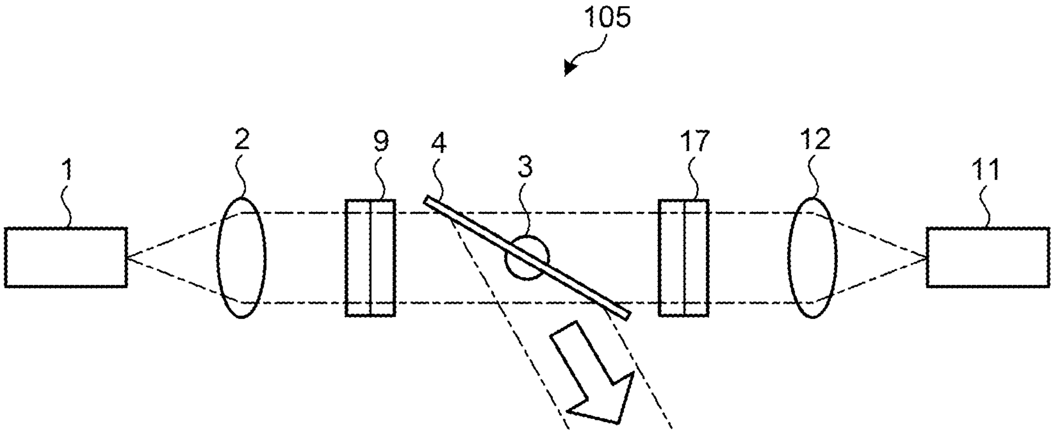
FIG. 11A is a plan view illustrating a structure of a LiDAR device according to a fifth embodiment.
Figure 11B:
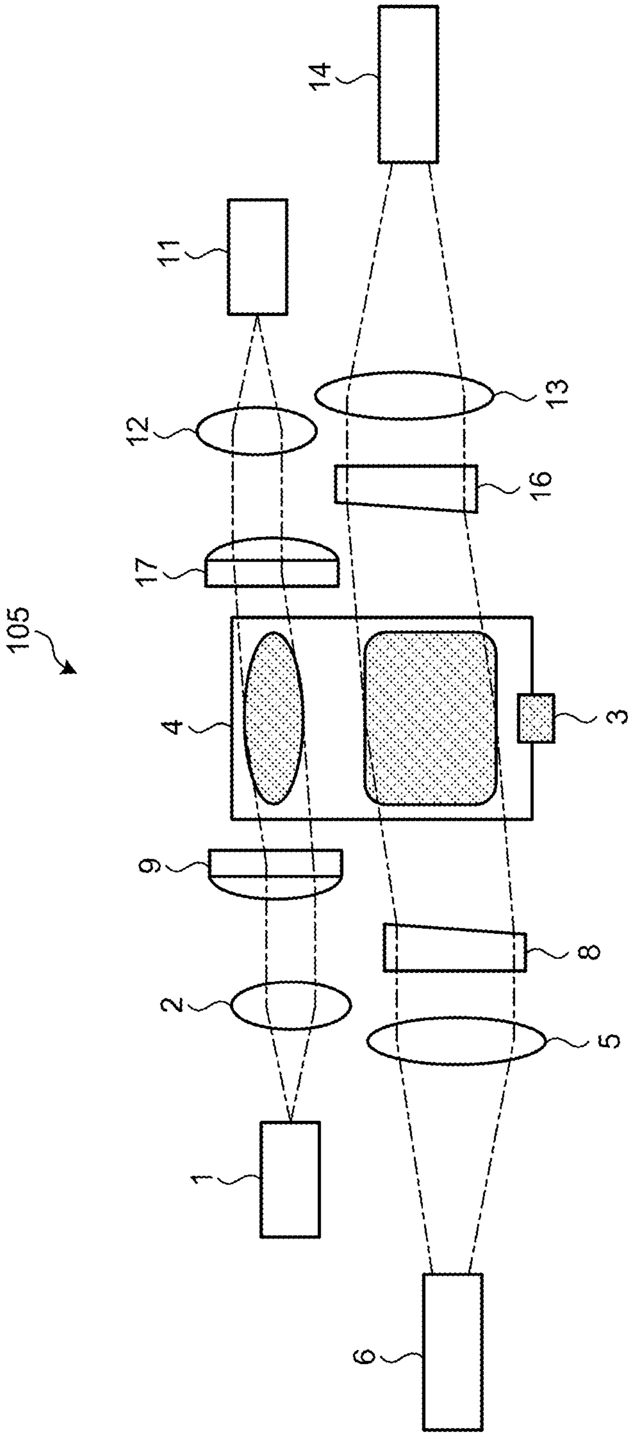
FIG. 11B is a front view illustrating a structure of the LiDAR device in the fifth embodiment.

FIG. 11A is a plan view illustrating a structure of a LiDAR device 105 according to a fifth embodiment. FIG. 11B is a front view illustrating a structure of the LiDAR device 105 in the fifth embodiment. The LiDAR device 105 of the present embodiment includes cylindrical lenses 9 and 17 in the optical path between the collimator lenses 2 and 12 and the double-sided mirror 4, instead of the prisms 7 and 15 in the LiDAR device 104 of the fourth embodiment.

The cylindrical lenses diverge the incident light into a sheet-like form. The direction of divergence of light by the cylindrical lenses 9 and 17 in the present embodiment is the up and down direction, and the cylindrical lenses 9 and 17 spread light longitudinally.

The cylindrical lenses 9 and 17 are arranged at positions where the main axis is shifted by a predetermined distance from the optical axis of the incident light (the optical axis of the light-emitting element) in a direction along the axis of rotation of the double-sided mirror 4 and the rotating stand 3. With this configuration, the cylindrical lens 9 corrects the orientation of the optical axis of the incident light upward, and the cylindrical lens 17 corrects the orientation of the optical axis of the incident light downward.

The optical axes of the cylindrical lenses 9 and 17 are shifted in the longitudinal (substantially vertical) direction, whereby the cylindrical lenses 9 and 17 can serve to shape and tilt a beam. In a horizontal scanning LiDAR device, the horizontal divergence angle of illumination light needs to be kept small. Unlike the axis shift of the collimator lenses 2 and 12 in the third embodiment, the axis shift of the cylindrical lenses 9 and 17 hardly increases aberrations in the horizontal direction and therefore optically has less adverse effects.

Such a configuration therefore can achieve effects equivalent to or greater than the LiDAR device 101 in the first embodiment.

While certain embodiments have been described, these embodiments have been presented by way of example only, and are not intended to limit the scope of the inventions. Indeed, the novel embodiments described herein may be embodied in a variety of other forms; moreover, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A LiDAR device comprising:

a rotating mirror being driven to rotate around an axis of rotation oriented longitudinally;

light emitters, each being configured to emit light toward the rotating mirror; and light receivers, each being configured to receive light reflected by the rotating mirror and convert the received light into an electrical signal, wherein the rotating mirror includes reflective surfaces reflecting light, each of the reflective surfaces is configured to, with rotation of the rotating mirror, cause light emitted by a corresponding one of the light emitters to scan a distance measurement range in a lateral direction, and cause light reflected from the distance measurement range to travel toward a corresponding one of the light receivers, the light emitters include a first light emitter configured to emit light in an orientation where an upper section of the distance measurement range is scanned, the distance measurement range being divided into the upper section and a lower section, and a second light emitter configured to emit light in an orientation where the lower section of the distance measurement range is scanned, the first light emitter is provided at a position facing one of the reflective surfaces, and the second light emitter is provided at a position facing another one of the reflective surfaces whose orientation is different from the one of the reflective surfaces to which the first light emitter faces, the light receivers include a first light receiver provided at a position where light emitted by the first light emitter and reflected at the distance measurement range is received via the rotating mirror, and a second light receiver provided at a position where light emitted by the second light emitter and reflected at the distance measurement range is received via the rotating mirror, the first light emitter and the second light emitter each include at least a light-emitting element and a collimator lens, an optical axis of the light-emitting element and an axis of rotational symmetry of the collimator lens are substantially parallel to a virtual plane orthogonal to the axis of rotation of the rotating mirror, the axis of rotational symmetry of the collimator lens is shifted by a predetermined distance from the optical axis of the light-emitting element in a direction along the axis of rotation of the rotating mirror, and the first light receiver at least includes an imaging lens, a light-receiving element configured to convert an image formed by the imaging lens into an electrical signal, and a prism disposed in an optical path between the rotating mirror and the imaging lens to correct an orientation of an optical axis incident obliquely from above to a substantially horizontal orientation, and the second light receiver at least includes an imaging lens, a light-receiving element configured to convert an image formed by the imaging lens into an electrical signal, and a prism disposed in an optical path between the rotating mirror and the imaging lens to correct an orientation of an optical axis incident obliquely from below to a substantially horizontal orientation.

2. The LiDAR device according to claim 1, wherein the first light emitter and the second light emitter each include at least a light-emitting element and a collimator lens, and an optical axis of the light-emitting element and an axis of rotational symmetry of the collimator lens are tilted with respect to a virtual plane orthogonal to the axis of rotation of the rotating mirror.

3. A LiDAR device comprising:

a rotating mirror being driven to rotate around an axis of rotation oriented longitudinally;

light emitters, each being configured to emit light toward the rotating mirror; and light receivers, each being configured to receive light reflected by the rotating mirror and convert the received light into an electrical signal, wherein the rotating mirror includes reflective surfaces reflecting light, each of the reflective surfaces is configured to, with rotation of the rotating mirror, cause light emitted by a corresponding one of the light emitters to scan a distance measurement range in a lateral direction, and cause light reflected from the distance measurement range to travel toward a corresponding one of the light receivers, the light emitters include a first light emitter configured to emit light in an orientation where an upper section of the distance measurement range is scanned, the distance measurement range being divided into the upper section and a lower section, and a second light emitter configured to emit light in an orientation where the lower section of the distance measurement range is scanned, the first light emitter is provided at a position facing one of the reflective surfaces, and the second light emitter is provided at a position facing another one of the reflective surfaces whose orientation is different from the one of the reflective surfaces to which the first light emitter faces, the light receivers include a first light receiver provided at a position where light emitted by the first light emitter and reflected at the distance measurement range is received via the rotating mirror, and a second light receiver provided at a position where light emitted by the second light emitter and reflected at the distance measurement range is received via the rotating mirror, the first light emitter and the second light emitter each include at least a light-emitting element and a collimator lens, an optical axis of the light-emitting element and an axis of rotational symmetry of the collimator lens are substantially matched with each other and substantially parallel to a virtual plane orthogonal to the axis of rotation of the rotating mirror, the LiDAR device further comprises a cylindrical lens provided in an optical path between the collimator lens and the rotating mirror, and a main axis of the cylindrical lens is shifted by a predetermined distance from the optical axis of the light emitting element in a direction along the axis of rotation of the rotating mirror.

4. The LiDAR device according to claim 3, wherein the first light receiver at least includes an imaging lens, a light-receiving element configured to convert an image formed by the imaging lens into an electrical signal, and a prism disposed in an optical path between the rotating mirror and the imaging lens to correct an orientation of an optical axis incident obliquely from above to a substantially horizontal orientation, and the second light receiver at least includes an imaging lens, a light-receiving element configured to convert an image formed by the imaging lens into an electrical signal, and a prism disposed in an optical path between the rotating mirror and the imaging lens to correct an orientation of an optical axis incident obliquely from below to a substantially horizontal orientation.

5. A LiDAR device comprising:

a rotating mirror being driven to rotate around an axis of rotation oriented longitudinally;

light emitters, each being configured to emit light toward the rotating mirror; and light receivers, each being configured to receive light reflected by the rotating mirror and convert the received light into an electrical signal, wherein the rotating mirror includes reflective surfaces reflecting light, each of the reflective surfaces is configured to, with rotation of the rotating mirror, cause light emitted by a corresponding one of the light emitters to scan a distance measurement range in a lateral direction, and cause light reflected from the distance measurement range to travel toward a corresponding one of the light receivers, the light emitters include a first light emitter configured to emit light in an orientation where an upper section of the distance measurement range is scanned, the distance measurement range being divided into the upper section and a lower section, and a second light emitter configured to emit light in an orientation where the lower section of the distance measurement range is scanned, the first light emitter is provided at a position facing one of the reflective surfaces, and the second light emitter is provided at a position facing another one of the reflective surfaces whose orientation is different from the one of the reflective surfaces to which the first light emitter faces, the light receivers include a first light receiver provided at a position where light emitted by the first light emitter and reflected at the distance measurement range is received via the rotating mirror, and a second light receiver provided at a position where light emitted by the second light emitter and reflected at the distance measurement range is received via the rotating mirror, the first light emitter and the second light emitter each include at least a light-emitting element and a collimator lens, an optical axis of the light-emitting element and an axis of rotational symmetry of the collimator lens are substantially matched with each other and substantially parallel to a virtual plane orthogonal to the axis of rotation of the rotating mirror, the first light emitter includes a prism in an optical path between the collimator lens and the rotating mirror to correct an orientation of an optical axis upward, and the second light emitter includes a prism in an optical path between the collimator lens and the rotating mirror to correct an orientation of an optical path downward.

6. The LiDAR device according to claim 5, wherein the first light receiver at least includes an imaging lens, a light-receiving element configured to convert an image formed by the imaging lens into an electrical signal, and a prism disposed in an optical path between the rotating mirror and the imaging lens to correct an orientation of an optical axis incident obliquely from above to a substantially horizontal orientation, and the second light receiver at least includes an imaging lens, a light-receiving element configured to convert an image formed by the imaging lens into an electrical signal, and a prism disposed in an optical path between the rotating mirror and the imaging lens to correct an orientation of an optical axis incident obliquely from below to a substantially horizontal orientation.

* * * * *